Figure 1:
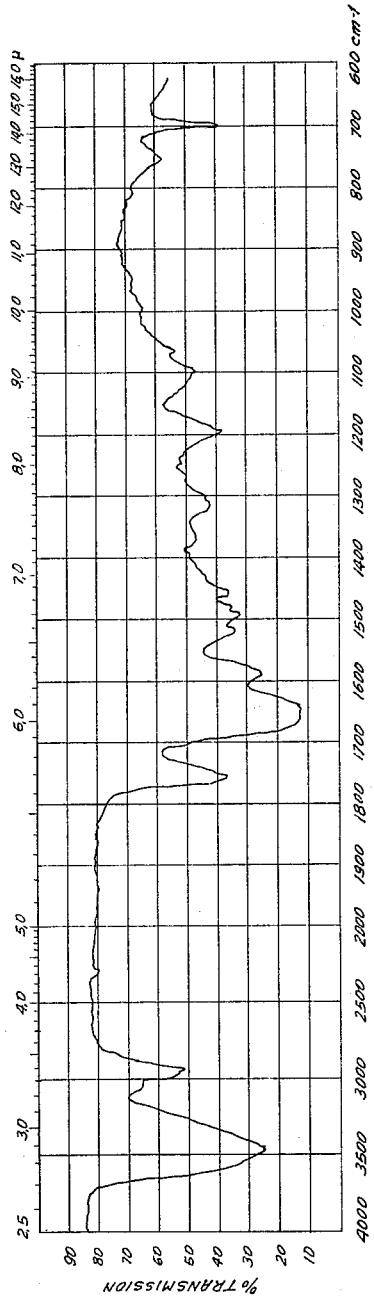

3,282,787
ACTINOMYCIN Z AND METHOD OF
PRODUCING SAME
Ernst Gaeumann and Vladimir Prelog, Zurich, and Ernst Vischer, Basel, Switzerland, assignors to Ciba Corporation, a corporation of Delaware
Filed July 23, 1959, Ser. No. 828,982
Claims priority, application Switzerland, July 25, 1958, 62,213; June 5, 1959, 74,048
10 Claims. (Cl. 167—65)

The present invention relates to a new antibiotic which is hereinafter referred to as "actinomycin Z," its constituents, its derivatives and fission products and also pharmaceutical preparations containing these compounds and to methods of preparing these substances and mixtures of substances.

The antibiotic actinomycin Z is produced on the culture of a new strain of Streptomyces fradiae which is hereinafter described as strain NRRL 2765. The latter has been isolated from a soil sample collected at Horsham, England, and is kept at our laboratories and at the Eidgenossische Technische Hochschule, Institute for Special Botany, Zurich, under the designation A20675.

Streptomyces fradiae NRRL 2765 forms a dark-red-cinnamon-brown-brownish-grey air mycelium. The individual spores are smooth. The spore chains form open, regular spirals generally having more than five turns. They are monopodially branched and have a long straight main axis. When cultivated on nutrient substrata containing peptone, strain NRRL 2765 causes no melanoid coloration. Growth is relatively little dependent on temperature and the mould develops well both at 18° C. and at 40° C., but the optimum growth is between 25° C. and 32° C.

For the purpose of further characterization, the growth of strain NRRL 2765 on various nutrient media is described below. The nutrient media 1–7 and 10 are prepared as described by W. Lindenbein, Arch. Mikrobiol. vol. 17, page 361 (1952).

(1) Synthetic agar: Growth punctiform to pustular, deep yellow or chestnut brown. Air mycelium velvety, light grey to brownish grey. Substratum deep yellow to dark brown.

(2) Synthetic solution: Sediment, flocks mik-white to light brown. Pellicle punctiform, white yellow. Substratum light brown.

(3) Glucose-agar: Growth thin, cloud-like, white yellow. No air mycelium is formed. Substratum not discolored.

(4) Glucose-asparagin-agar: Growth thin, cloud-like, egg yellow at first, golden yellow brownish-yellow later. Air mycelium velvety, cinnamon brown to brownish-grey.

(5) Calcim malate-agar: Growth punctiform to pustular, egg yellow. Air mycelium velvety, snow-white to cinnamon brown. Substratum brownish-yellow.

(6) Gelatin stab culture (18° C.): Surface growth in the form of specks, brownish-yellow. No air mycelium is formed. Substratum chestnut brown. Liquefaction after 20 days amounts to 0.6 cm., after 30 days 1.1 cm.

(7) Starch plate: Growth pustular, golden yellow. Air mycelium sparse, powdery, forming a fine coating, chalk-white. Hydrolysis after 8 days amounts to 0.7 cm.

(8) Potatoes: Growth wrinkled, light brown. Air mycelium sparse, light grey to brownish-grey. Substratum not discolored.

(9) Carrots: Growth wrinkled, light brown. Air mycelium sparse, chalk-white. Substratum dark brown.

(10) Litmus milk: Growth sparse. Pellicle thin, light yellow. No peptonization or coagulation. Litmus red.

As regards appearance of the spores, color of the air mycelium, spiral formation of the spore chains and melanoid coloration of nutrient substrata containing peptone, strain NRRL 2765 is identical with Streptomyces fradiae and is therefore allocated for the time bing to this species.

As regards the manufacture of the antibiotic actinomycin Z, the present invention is not limited to the use of strain NRRL 2765 or of other strains corresponding to the description, but also relates to the use of variants of these organisms such as are obtained, for example, by selection or mutation, in particular under the action of ultra-violet rays or X-rays or nitrogen mustard.

In order to produce the antibiotic actinomycin Z, a strain of streptomycetes exhibiting the properties of NRRL 2765 is aerobically cultivated, in an aqueous nutrient solution containing inorganic salts and a source of carbon and nitrogen until the solution exhibits a substantial antibacterial action, and the antibiotic actinomycin Z is thereupon isolated.

As inorganic salts, the nutrient solution contains, for example, chlorides, nitrates, carbonates or sulfates of alkali metals, alkaline earth metals, magnesium, iron, zinc or manganese. Sources of carbon are, in particular, carbohydrates, such as, for instance, glucose, saccharose, lactose and starch. As nitrogenous compounds and growth-promoting substances to be added if required there may be mentioned, for example: amino-acids and mixtures thereof, peptides and proteins and their hydrolyzates, such as peptone or tryptone, meat extracts, water-soluble constituents of cereal grains, such as maize and wheat, of distillation residues in the manufacture of alcohol, of yeast, beans, especially of soya bean plants, and of seeds, for example of cotton plants.

The cultivation is carried out aerobically, thus, for example, in a quiescent surface culture or preferably immersed while being agitated or stirred with air or oxygen in a shaking bottle or a known fermenter. A suitable temperature is one between 18° C. and 40° C. The nutrient solution generally exhibits a substantial antibacterial action after 24 to 96 hours.

In order to isolate the antibiotic, the following methods may, for example, be used: The mycelium is separated from the culture filtrate, whereupon the bulk of the antibiotic is found in the culture filtrate. However, appreciable amounts of the antibiotic nevertheless remain adsorbed on the mycelium. It is therefore advantageous to wash the mycelium well. Organic, at least partially water-soluble solvents, such as alcohols, for example methanol, ethanol and butanols, or ketones, for example acetone and methylethyl ketone, are particularly suitable for this purpose. These mycelium extracts are added to the culture filtrate either direct or after previous concentration in vacuo. The mixture is extracted with an organic solvent immiscible with water, such as esters of lower fatty acids, for example ethyl acetate or amyl acetate, hydrocarbons, for example benzene, chlorinated hydrocarbons, for example ethylene chloride, methylene chloride or chloroform, ketones, for example methyl propyl ketone, methyl amyl ketone or diisobutyl ketone, alcohols, such as butyl alcohols or amyl alcohols, ethers, for example ethyl ether, diisopropyl ether, dibutyl ethers or glycol ethers and the like. Instead of extracting the cultures by means of a solvent, or in combination with such a method of extraction as a further purifying operation, it is also possible to obtain the antibiotic by adsorption, for example on active carbon or on activated earths, such as fuller's earth or floridin, and subsequent extraction of the adsorbate, for example by means of an organic solvent at least partially soluble in water, such as acetone, butanol or methylethyl ketone.

It is also possible to extract the cultures directly, without preceding separation of the mycelium, in the manner indicated.

Further enrichment can be obtained by first extracting the organic extracts containing the antibiotic with an aqueous acid solution having a pH value of less than 5 and then repeatedly with an aqueous alkaline solution having a pH value of more than 8, the bulk of the antibiotic activity remaining in the organic phase, from which the actinomycin Z is isolated. Suitable as aqueous acid solutions are dilute acids, such as acetic acid, hydrochloric acid or sulfuric acid, or buffer solutions, such as citrate or phosphate buffers, and, as aqueous alkaline solutions, dilute alkalis, such as caustic soda solution or caustic potash solution, or buffer solutions, such as phosphate buffers and the like.

The crude actinomycin Z can be precipitated directly as an amorphous red powder from the concentrates of such extracts by adding petroleum ether, pentane, hexane and the like.

A good method of purifying the new antibiotic is constituted by chromatography, aluminum oxide having proved to be particularly satisfactory as adsorbent. The recovery of the pure antibiotic in crystalline form is carried out, for example, from organic solvents, such as acetone, methanol, ethanol, chloroform, acetone-ethanol mixtures, acetone-ether mixtures or acetone-petroleum ether mixtures. The same solvents are used for recrystallization or aqueous-organic solutions, such as dilute alcohols, dilute acetone, etc.

Actinomycin Z crystallizes in fine red rodlets. Melting point 260–264° C., $[\alpha]_D^{22} = -314°$ (c. =0.246 in chloroform). Elementary analysis gives the following values: C=54.88%, 54.65%; H=6.42%, 6.57%; N=12.25%, 12.03%; O (calculated)=26.60%. Its ultra-violet adsorption spectrum shows bands at 242 m$\mu$ (log $E_{1cm.}^{1\%}$=2.34), at 429 m$\mu$ (log $E_{1cm.}^{1\%}$=2.25) and at 443 m$\mu$ (log $E_{1cm.}^{1\%}$=2.27)

In the infra red spectrum, taken in potassium bromide cf. FIG. 1 bands are visible inter alia at the following wave lengths: 2.89$\mu$, 3.36$\mu$, 3.40$\mu$, 5.70$\mu$, 6.05$\mu$, 6.30$\mu$, 6.60$\mu$, 6.67$\mu$, 7.07$\mu$, 7.31$\mu$, 7.58$\mu$, 7.65$\mu$, 8.36$\mu$, 9.00$\mu$, 9.12$\mu$, 9.39$\mu$, 13.30$\mu$, and 14.40$\mu$.

The antibiotic actinomycin Z consists of at least six constituents $Z_0$, $Z_1$, $Z_2$, $Z_3$, $Z_4$ and $Z_5$ which can be separated by means of paper chromatography and which are different from the constituents of the known actinomycins C, X and J. The corresponding data are assembled in the following table, the $RC_2$ values (=ratio of the path on the paper of an unknown actinomycin to the path of actinomycin $C_2$) being given, in accordance with a proposal made by Brockmann and Grohne (Chemische Berichte, vol. 87, page 1036 (1954)), for the individual constituents:

| | $Z_0$ | $Z_1$ | $Z_2$ | $Z_3$ | $Z_4$ | $Z_5$ |
|---|---|---|---|---|---|---|
| Actinomycin Z $RC_2$ value | about 0.35 | 0.39 | 0.78 | 1.63 | 2.36 | 2.55 |
| Actinomycin C $RC_2$ value | | | $C_1$ 0.63 | $C_2$ 1.00 | $C_3$ 1.52 | |
| Actinomycin J $RC_2$ value | | | $J_1$ 0.65 | | | |
| Actinomycin X $RC_2$ value | $X_0$ 0.20 | | $X_1$ 0.65 | $X_2$ 1.05 | | |

Suitable for these paper chromatography tests is a solvent system consisting of sodium metacresotinate and a mixture of 1 part by volume of di-n-butyl ether and 3 parts by volume of n-butyl acetate.

Chromatography is suitable for isolating the six constituents of actinomycin Z. Aluminum oxide or cellulose have proved to be particularly suitable as adsorbents. Distribution between two immiscible or only partially miscible phases is also very advantageous for enriching the individual constituents. Advantageously, the counter-current method is employed. A mixture of an aqueous solution of sodium β-naphthalene sulfonate and isopropyl ether has proved to be a particularly favorable solvent system. These methods mentioned can be employed separately or in combination with one another. The following combination has proved to be particularly advantageous for preparing the six constituents of actinomycin Z in a pure condition:

(1) Chromatography on aluminum oxide, it being possible for the constituents $Z_0$ and $Z_1$ to be separated from one another and from constituents $Z_{2-5}$;

(2) Counter-current distribution, the constituent $Z_5$ being separated off;

(3) Chromatography on cellulose, the constituents $Z_2$, $Z_3$ and $Z_4$ being separated from one another.

The constituents of actinomycin Z can be obtained in crystalline form, the solvents and solvent mixtures indicated for the crystallization of actinomycin Z being preferably employed. These constituents are characterized in greater detail hereunder:

Actinomycin $Z_0$: Orange-brown microcrystalline powder; decomposition takes place at 250° C.; ultra-violet absorption in fine spirit: bands at 236 m$\mu$ (log $E_{1cm.}^{1\%}$=2.44) and at 437 m$\mu$ (log $E_{1cm.}^{1\%}$=2.17)

Actinomycin $Z_1$: Orange-red crystals; melting point 256–260° C. (decomposition); $[\alpha]_D^{22} = -362°$ (c=0.185 in chloroform)

elementary analysis: C=53.97%; H=6.79%;

N=12.30%

O (calculated)=26.94%; $(CH_3)N$=7.48%; $CH_3O$=0%; ultraviolet absorption spectrum in fine spirit; bands at 240 m$\mu$ (log $E_{1cm.}^{1\%}$=2.25), 427 m$\mu$ (log $E_{1cm.}^{1\%}$=2.00) and at 442 m$\mu$ (log $E_{1cm.}^{1\%}$=2.01)

Figure 2:
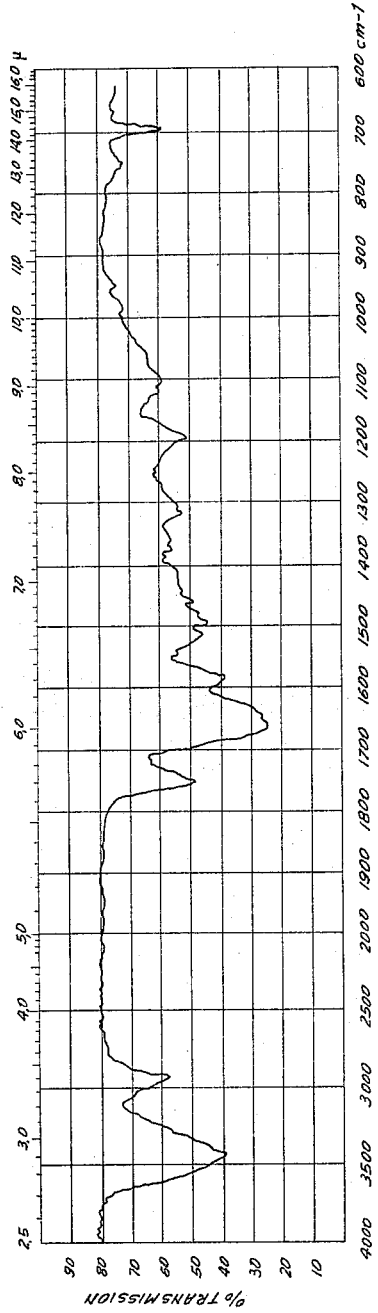

IR–spectrum in potassium bromide cf. FIG. 2.

Actinomycin $Z_5$: Red crystals; melting point 261–267° C. (decomposition);$[a]_D^{22} = -284°$ (c.=0.244 in chloroform); elementary analysis: C=55.71%;

H=6.44%

N=12.25%; ultra-violet absorption spectrum in fine spirit: bands at 240 m$\mu$ (log $E_{1cm.}^{1\%}$=2.40), at 428 m$\mu$ (log $E_{1cm.}^{1\%}$=2.21) and at 423 m$\mu$ (log $E_{1cm.}^{1\%}$=2.24)

Figure 3:
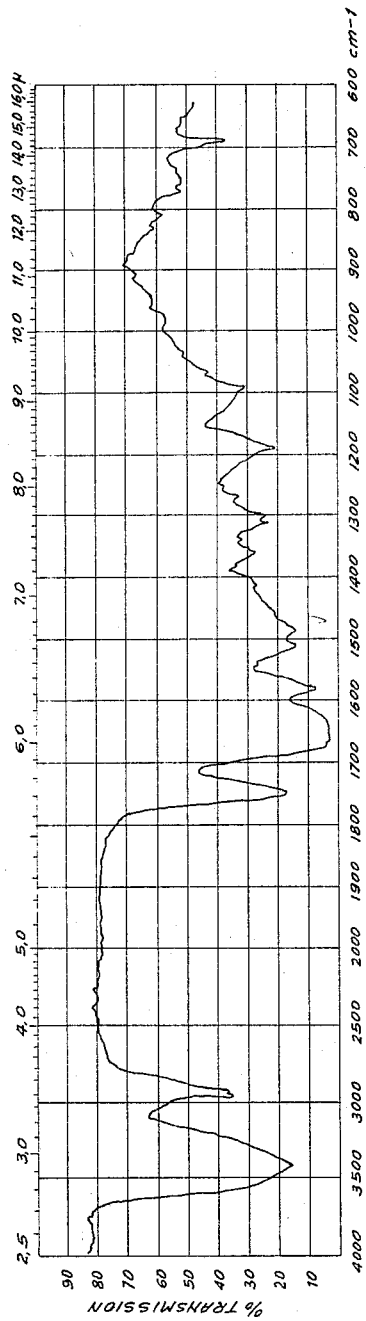

IR–spectrum in potassium bromide cf. of FIG. 3.

On acid hydrolysis of actinomycin Z and of its constituents $Z_0$, $Z_1$, $Z_2$, $Z_3$, $Z_4$ and $Z^5$, there are produced, inter alia, the amino-acids N-methylvaline, valine, N-methylalanine, sarcosine and threonine.

The antibiotic actinomycin Z has a very high antibiotic activity against various test organisms. If dilution series (tenth powers) in glucose broth which are incubated for 24 hours at 37° C. are used at test method in vitro, the following checking concentrations are obtained:

Test organisms:  Checking concentration in $\mu$g. per cc.

*Micrococcus pyogenes* var. *aureus* _____ 10
*Micrococcus pyogenes* var. *aureus*, Penicillin-resistant _____ 10
*Streptococcus pyogenes* _____ 10
*Streptococcus viridans* _____ 10
*Streptococcus faecalis* _____ 10
*Corynebacterium diphthtriae* _____ 10
*Bacillus megatherium* _____ 10
*Mycobacterium tuberculosis* [1] _____ 100
*Entamoeba histolytica* [2] _____ 1000
*Trichomonas foetus* [3] _____ 40

[1] Cultivated in Kirchner's synthetic medium with 5% bovine albumin; growth read after two weeks.
[2] Culture in bacto-entamoeba medium, amoebicidal action read after 24 hours.
[3] Cultivated in broth containing 10% of horse serum at 37° C.; reading taken after 4 days.

The development of influenza virus on isolated membranes of the chick chorio-allantois of 14-day hatching eggs is checked in a concentration of 10 $\mu$g. per cc.

An object of the present invention, apart from the methods of preparing the antibiotic actinomycin Z and its constituents $Z_0$, $Z_1$, $Z_2$, $Z_3$, $Z_4$ and $Z_5$, is also formed by the said compounds themselves.

The antibiotic actinomycin Z, its constituents $Z_0$, $Z_1$, $Z_2$, $Z_3$, $Z_4$ and $Z_5$, or suitable mixtures may be employed as medicaments, for example in the form of pharmaceutical preparations. These preparations contain the said compounds in admixture with a pharmaceutical organic or inorganic carrier suitable for enteral, parenteral or local administration. For making the carrier there are used substances which do not react with the new compounds, such as, for example, gelatine, lactose, starch, magnesium stearate, talc, vegetable oils, benzyl alcohols, gums, polyalkylene glycols, white petroleum jelly, cholesterol or other known carriers for medicaments. The pharmaceutical preparations may be in the form, for example, of tablets, dragees, powders, salves, creams, suppositories or in liquid form as solutions, suspensions or emulsions. If desired, they are sterilized and/or contain auxiliary substances, such as preserving, stabilizing, wetting or emulsifying agents. They may also contain other therapeutically valuable substances.

The invention is illustrated in the following examples, but no limitation of the object of the invention is thereby intended. The temperatures are given in degrees centigrade.

Example 1

A nutrient solution of the following composition is prepared: 20 grams of soya bean meal, 20 grams of mannitol and 1 liter of tap water, and the solution is adjusted to a pH value of 7.8. This solution, or a multiple thereof, is emptied into 500 cc. Erlenmeyer flasks (each contains 100 cc. of nutrient solution) or into 500 liter fermenters (each contains 300 liters of nutrient solution) and sterilized for 20–30 minutes under 1 atmosphere gauge pressure. Inoculation is then carried out with up to 10% of a partially sporulating vegetable culture of strain NRRL 2765 and incubation is carried out while shaking or stirring well at 27° C., cultures in fermenters being aerated (with about 1 volume of sterile air per volume of nutrient solution per minute). After 70–120 hours of growth, the cultures are filtered—a filtration assistant being added according to volume—through a suction filter or a filter press or a rotating filter and the antibiotically active aqueous solution is thus freed from the mycelium and other solid constituents.

Example 2

If the nutrient solutions (a), (b), (c) or (d) described hereunder are employed instead of the medium indicated in Example 1, aqueous antibiotically active solutions are obtained after similarly performed sterilization, inoculation with strain NRRL 2765, incubation at 27° C. and filtration:

(a) 10 grams of galactose, 5 grams of peptone, 3 grams of meat extract (Oxo Lab Lemco) and 1 liter of tap water; the pH value before sterilization is 7.5.

(b) 20 grams of malt extract, 20 cc. of corn steep liquor, 5 grams of sodium chloride, 0.2 gram of secondary potassium hydrophosphate, 2 grams of calcium carbonate and 1 liter of tap water; the pH value before sterilization is 7.5.

(c) 20 grams of glycerine, 2.5 grams of glycol, 1.0 gram of sodium chloride, 0.1 gram of secondary potassium hydrophosphate, 0.1 gram of crystalline ferrous sulfate, 0.1 gram of crystalline magnesium sulfate, 0.5 gram of calcium carbonate and 1 liter of tap water; the pH value before sterilization is 7.5.

(d) 20 grams of glycerine, 1 gram of casein hydrolyzate, 10 grams of potassium nitrate, 5 grams of secondary potassium hydrophosphate, 5 grams of sodium chloride, 5 grams of magnesium sulfate, 10 milligrams of crystalline ferrous sulfate and 1 liter of tap water; the pH value before sterilization is 7.5.

Example 3

The filtration residue of a 120 liter mixture obtained as described in Example 1 or 2 is thoroughly stirred with 15 liters of acetone and filtered again. This process is repeated twice, whereupon the acetone solutions containing antibiotic are combined concentrated in vacuo to 5 liters and combined with the culture filtrate. This solution is extracted with 70 liters of ethyl acetate, the entire antibacterial activity being transferred to the organic phase. The extract is washed with water, evaporated in vacuo to 5 liters and then shaken several times with 0.5-n acetic acid and with 2-n caustic soda solution. Finally, the ethyl acetate solution is dried over sodium sulfate and concentrated in vacuo to 2 liters. By adding 1 liter of petroleum ether, the crude actinomycin Z is precipitated therefrom in the form of an orange-red powder (yield: 11.5 grams).

Example 4

9.5 grams of the crude actinomycin Z obtained as described in Example 3 are chromatographed on a column of 260 grams of neutral aluminum oxide of activity III. The column is eluted with 500 cc. of absolute benzene and 500 cc. of chloroform and with 700 cc. of a chloroform-methanol mixture (98:2). Only colorless, inactive by-products are dissolved with the first two solvents, whereas the chloroform-methanol eluate is deep red in color and, after evaporation in vacuo, yields 4.5 grams of a red amorphous biologically active residue. By crystallization from a mixture of acetone and ether, the pure actinomycin Z is obtained therefrom in the form of reddish-orange crystals which melt and decompose at 260–264° C. $[\alpha]_D^{22} = -314°$ (c.=0.246 in chloroform). Elementary analysis gives the following values: C=54.88%; H=6.42% and N=12.25%; O (calculated)=26.45%. The ultra-violet spectrum taken in fine spirit shows the following absorption maxima:

$$\lambda_{max}.\ 242\ \ 429\ \ 443\ m\mu$$
$$\log E_{1cm}^{1\%}\ 2\ 34\ \ 2.25\ \ 2.27$$

In the infra red absorption spectrum (cf. FIG. 1) there are bands, inter alia, at $2.89\mu$, $3.36\mu$, $5.70\mu$, $6.05\mu$, $3.40\mu$, $6.30\mu$, $6.60\mu$, $6.67\mu$, $7.07\mu$, $7.31\mu$, $7.58\mu$, $7.65\mu$, $8.35\mu$, $9.00\mu$, $9.12\mu$, $9.39\mu$, $13.30\mu$ and $14.40\mu$.

Investigation of crystalline actinomycin Z by paper chromatography (round filter method using 10% aqueous solution of sodium metacresotinate as stationary phase and a mixture of 3 parts by volume of butyl acetate and 1 part by volume of dibutyl ether as mobile phase) shows that it consists of at least six constituents ($Z_0$, $Z_1$, $Z_2$, $Z_3$, $Z_4$ and $Z_5$) which exhibit the following $RC_2$ values ($RC_2$ ratio of the path of the unknown substance to the path of the constituent $C_2$ of actinomycin C):

| Constituent: | $RC_2$ value |
|---|---|
| $Z_0$ | 0.35 |
| $Z_1$ | 0.39 |
| $Z_2$ | 0.78 |
| $Z_3$ | 1.63 |
| $Z_4$ | 2.36 |
| $Z_5$ | 2.55 |

Example 5

A solution of 30 milligrams of actinomycin Z in a mixture of 1 cc. of concentrated hydrochloric acid and 1 cc. of water is sealed in a glass tube and heated for 20 hours at 110–120° C. After cooling, the hydrolysis mixture is filtered and evaporated in vacuo to dryness. The residue is investigated by means of two-dimensional paper chromatography, the following solvent systems being employed:

(a) Phenol saturated with water and
(b) A mixture of n-butanol, glacial acetic acid and water in the volumetric ratio 4:1:1.

The paper chromatograms are colored on the one hand with ninhydrin and on the other hand with pyridine and p-nitrobenzoyl chloride. In this way, the amino-acids N-methylvaline, valine, N-methylalanine, sarcosine and threonine can be detected in the hydrolysis mixture.

*Example 6*

A solution of 750 milligrams of crystalline actinomycin Z obtained as described in Example 4 in 20 cc. of benzene is added to a column of 100 grams of aluminum oxide (activity III according to Brockmann, neutral). 100 cc. of benzene and 100 cc. of chloroform are allowed to run through the column, no elution taking place. The chromatogram is then developed with a mixture of chloroform and methanol (99:1), three red zones being formed. The lowermost can be eluted with 120 cc. of this mixture and consists of the actinomycins $Z_2$, $Z_3$, $Z_4$ and $Z_5$. A further 500 cc. of the said mixture elute the second zone, which consists of the homogeneous actinomycin $Z_1$. This is crystallized from acetone-ether and forms orange-red crystals having a melting point of 256–260° C. (decomposition); $[\alpha]_D^{22} = -362°$ (c.=0.185 in chloroform); elementary analysis: C=53.97%; H=6.79%; N=12.30%; $(CH_3)N$=7.48%; $CH_3O$=0%; ultra-violet absorption spectrum in rectified spirit $\lambda_{max.}$=240 m$\mu$ (log $E_{1cm.}^{1\%}$=2.25); 427 m$\mu$ (log $E_{1cm.}^{1\%}$=2.00); 442 m$\mu$ (log $E_{1cm.}^{1\%}$=2.01)

The infrared spectrum is identical with that of actinomycin-Z-mixture, cf. FIG. 2.

The third zone of the chromatogram is eluted with 150 cc. of a chloroform-methanol mixture (97:3). It consists of homogenous actinomycin $Z_0$. This is obtained from acetone-ether as orange-brown, microcrystalline powder which decomposes at about 250° C. In paper chromatography it shows the same behaviour as actinomycin Z, but the zone is less sharp. Its ultra-violet absorption spectrum in fine spirit shows bands at 236 m$\mu$ (log $E_{1cm.}^{1\%}$=2.44) and at 437 m$\mu$ (log $E_{1cm.}^{1\%}$=2.17)

*Example 7*

390 milligrams of the mixture of components $Z_2$, $Z_3$, $Z_4$ and $Z_5$ of actinomycin Z obtained as described in Example 6 are subjected to a 100-stage counter-current distribution, the following solvent mixture being employed: 2% aqueous solution of sodium naphthalene-$\beta$-sulfonate as stationary phase and a mixture of 4 parts by volume of isopropyl ether and 1 part by volume of ethyl acetate as mobile phase. After 100 transfers, there are three substance and color maxima in fractions 6, 55 and 88. The contents of distribution vessels 0–15, 41–65 and 81–92 are combined. Fractions 0–15 contain actinomycin $Z_1$ and impurities, while a mixture of actinomycins $Z_2$, $Z_3$ and $Z_4$ which is obtained from acetone-ether in the form of fine red crystals which slowly decompose at about 260° C. $[\alpha]_D^{22}$=−296° (c.=0.257 in chloroform; ultra-violet absorption spectrum in rectified spirit:

$\lambda_{max.}$=240 m$\mu$ (log $E_{1cm.}^{1\%}$=2.36); 428 m$\mu$ (log $E_{1cm.}^{1\%}$=2.17); 441 m$\mu$ (log $E_{1cm.}^{1\%}$=2.18)

is present in fractions 41–65. Pure crystalline actinomycin $Z_5$ is obtained from fractions 81–92 by treating them with acetone and ether. Melting point: 261–267° C. (decomposition) $[\alpha]_D^{22}$=−284° (c.=0.244 in chloroform); ultra-violet absorption spectrum in fine spirit: bands at 240 m$\mu$ (log $E_{1cm.}^{1\%}$=2.40), at 428 m$\mu$ (log $E_{1cm.}^{1\%}$=2.21) and at 443 m$\mu$ (log $E_{1cm.}^{1\%}$=2.24)

Elementary analysis: C=55.71%; H=6.44%;

N=12.25%

O (calculated) 25.60%; infra red spectrum in potassium bromide, cf. FIG. 3 bands are visible inter alia at the following wave lengths: 2.89$\mu$, 3.36$\mu$, 3.40$\mu$, 5.70$\mu$, 6.05$\mu$, 6.30$\mu$, 6.60$\mu$, 6.67$\mu$, 7.07$\mu$, 7.31$\mu$, 7.58$\mu$, 7.65$\mu$, 8.36$\mu$, 9.00$\mu$, 9.12$\mu$, 9.39$\mu$, 13.30$\mu$ and 14.40$\mu$.

*Example 8*

30 grams of cellulose powder are mixed with 120 cc. of a 10% aqueous solution of sodium metacresotinate and then charged into a chromatographing column having a diameter of 2.6 cm. The excess aqueous solution is removed, whereupon the column is thoroughly washed with a mixture of 3 parts by volume of butyl acetate and 1 part by volume of dibutyl ether. 280 milligrams of actinomycin Z are dissolved in 15 cc. of this solvent mixture and this solution is added to the column and elution is continued with the same mixture, the following fractions being individually worked up and investigated by paper chromatography:

Fraction 1: 40 cc. actinomycin $Z_5$, homogeneous. Fraction 2: 40 cc., mixture of actinomycin $Z_4$, $Z_3$ and $Z_2$. Fraction 3: 180 cc., mixture of actinomycin $Z_3$, $Z_2$ and $Z_1$. Fraction 4: 130 cc., almost exclusively colorless by-products. Fraction 5: 300 cc., actinomycin $Z_1$, homogeneous.

*Example 9*

250 milligrams of a mixture of actinomycin $Z_2$, $Z_3$ and $Z_4$ obtained as described in Example 7 are chromatographed on 30 grams of cellulose powder by the method described in Example 8, fractions each consisting of 20 cc. of solvent being collected. Fractions 4, 6 and 10 respectively contain actinomycin $Z_4$, $Z_3$ and $Z_2$, which are found to be homogeneous by paper chromatography. These fractions are worked up separately. By treatment with acetone-ether, actinomycins $Z_4$, $Z_3$ and $Z_2$ are obtained in crystalline form.

*Example 10*

25 milligrams of the mixture of components $Z_2$, $Z_3$ and $Z_4$ of actinomycin (cf. Example 7) are separated on 4 sheets of Whatman paper No. 1 by the process described in Example 8. The zones of the individual components are cut out and eluted with alcohol. The eluates are evaporated, and the residues which contain ample sodium meta-cresotinate are dissolved in ethyl acetate and washed three times with dilute sodium carbonate solution and water. The dried solutions are evaporated and the residues purified once more on columns containing about 1 gram of aluminum oxide. There are obtained about 5 milligrams each of pure actinomycin $Z_3$ and $Z_4$. A yield of less than 1 milligram of actinomycin $Z_2$ is obtained.

Determination of the amino acids: About 3–5 milligrams each of pure actinomycin $Z_0$, $Z_1$, $Z_3$, $Z_4$ and $Z_5$ are each fused with 0.5 milligram of water and 0.5 milligram of concentrated hydrochloric acid in a small tube and hydrolyzed overnight at about 110° C. The hydrolysates are evaporated under reduced pressure and each dissolved in about 100 microliters of water. The amino acids are determined by two-dimensional paper chromatography. Vehicles: (1) water-saturated phenol, (2) butanol-glacial acetic acid-water 4:1:1. By means of the ninhydrin reaction the same 5 amino acids can be detected in the hydrolysates of all the actinomycin Z components, viz. threonin, sarcosine, N-methylalanine, valine and N-methyl-valine. Proline is not found in any case.

What is claimed is:

1. Process for the manufacture of the antibiotic actinomycin Z, which comprises cultivating *Steptomyces fradiae* NRRL 2765 in an aqueous nutrient solution containing inorganic salts, and a source of nitrogen and carbon, under aerobic conditions, until the nutrient solution shows a substantial antibacterial action, and the antibiotic actinomycin Z is then isolated.

2. Process for the manufacture of the antibiotic actinomycin Z according to claim 1, which comprises cultivating *Steptomyces fradiae* NRRL 2765 in an aqueous nutrient solution containing inorganic salts, and a source of nitrogen and carbon, under aerobic conditions, until the nutrient solution shows a substantial antibacterial action, and the antibiotic actinomycin Z is then isolated and separated into its components.

3. The crystalline antibiotic reddish-orange actinomycin Z prepared by the process of claim 1, melting at 260–264° C., having the optical rotation $[\alpha]_D^{22} = -314°$ (c.=0.246 in chloroform), giving in the elementary analysis the following values: C=54.88%, 54.65%; H=6.42%, 6.57%; N=12.25%, 12.03%; O (calculated)=26.60% the ultraviolet spectrum of which in ethanol exhibits maxima at 242 m$\mu$ (log $E_{1\,cm.}^{1\%}$=2.34), at 429 m$\mu$ (log $E_{1\,cm.}^{1\%}$=2.25) and at 443 m$\mu$ (log $E_{1\,cm.}^{1\%}$=2.27)

and the infra red spectrum taken in potassium bromide, bands at 2.89$\mu$, 3.36$\mu$, 3.40$\mu$, 5.70$\mu$, 6.05$\mu$, 6.30$\mu$, 6.60$\mu$, 6.67$\mu$, 7.07$\mu$, 7.31$\mu$, 7.58$\mu$, 7.65$\mu$, 8.36$\mu$, 9.00$\mu$, 9.12$\mu$, 9.39$\mu$, 13.30$\mu$, and 14.40$\mu$.

4. The crystalline orange-brown antibiotic actinomycin $Z_0$, which decomposes at 250° C. and the ultra-violet spectrum of which in ethanol shows bands at 236 m$\mu$ (log $E_{1\,cm.}^{1\%}$=2.44) and at 437 m$\mu$ (log $E_{1\,cm.}^{1\%}$=2.17)

showing in paper chromatography according to the round filter method using 10% aqueous solution of sodium metacresotinate as stationary phase and a mixture of 3 parts by volume of butyl acetate and 1 part by volume of dibutylether as mobile phase an Rf-value of 0.35 as referred to the Rf-value of actinomycin $C_2$=1.00 said component $Z_0$ having been isolated by subjecting the product obtained by the process of claim 1 to chromatography on aluminum oxide, developing the chromatogram with a mixture of chloroform and methanol (99:1) and eluting the component $Z_0$ with a mixture of chloroform and methanol (97:3).

5. The antibiotic mixture of the components actinomycin $Z_2$, $Z_3$ and $Z_4$, forming fine red crystals which slowly decompose at about 260° C., which show $$[\alpha]_D^{22} = -296°$$

(c.=0.257 in chloroform) and exhibit maxima in the ultraviolet absorption spectrum in ethanol at 240 m$\mu$ (log $E_{1\,cm.}^{1\%}$=2.36); 428 m$\mu$ (log $E_{1\,cm.}^{1\%}$=2.17); 441 m$\mu$ (log $E_{1\,cm.}^{1\%}$=2.18)

said mixture of components having been obtained by subjecting the product obtained by the process of claim 1 to chromatography on aluminum oxide, developing the chromatogram with a mixture of chloroform and methanol (99:1), eluting with a mixture of chloroform and methanol (99:1) a mixture of components $Z_2$, $Z_3$, $Z_4$ and $Z_5$, subjecting the latter to a 100-stage counter-current distribution with a 2% aqueous solution of sodium naphthalene-$\beta$-sulfonate as stationary phase and a mixture of 4 parts by volume of isopropyl ether and 1 part by volume of ethyl acetate as mobile phase, and isolating the mixture of components $Z_2$, $Z_3$ and $Z_4$ from fractions 41–65.

6. The crystalline antibiotic actinomycin $Z_2$ showing in paper chromatography according to the round filter method using 10% aqueous solution of sodium metacresotinate as stationary phase and a mixture of 3 parts by volume of butyl acetate and 1 part by volume of dibutylether as mobile phase an Rf-value of 0.78 as referred to the Rf-value of actinomycin $C_2$=1.00, said antibiotic having been produced by paper chromatographic separation of the product obtained by the process of claim 1.

7. The crystalline antibiotic actinomycin $Z_3$ showing in paper chromatography according to the round filter method using 10% aqueous solution of sodium metacresotinate as stationary phase and a mixture of 3 parts by volume of butyl acetate and 1 part by volume of dibutyl ether as mobile phase an Rf-value of 1.63 as referred to the Rf-value of actinomycin $C_2$=1.00, said antibiotic having been produced by paper chromatographic separation of the product obtained by the process of claim 1.

8. The crystalline antibiotic actinomycin $Z_4$ showing in paper chromatography according to the round filter method using 10% aqueous solution of sodium metacresotinate as stationary phase and a mixture of 3 parts by volume of butyl acetate and 1 part by volume of dibutyl ether as mobile phase and Rf-value of 2.36 as referred to the Rf-value of actinomycin $C_2$=1.00, said antibiotic having been produced by paper chromatographic separation of the product obtained by the process of claim 1.

9. The crystalline orange-red antibiotic actinomycin $Z_1$, melting at 256–260° C., having the optical rotation $[\alpha]_D^{22} = -362°$ (c.=0.185 in chloroform), giving in the elementary analysis the values: C=53.97%; H=6.79%; N=12.30%; O (calculated)=26.94%; $(CH_3)N$=7.48%; $CH_3O$=0%; the ultraviolet spectrum of which in ethanol exhibits maxima at 240 m$\mu$ (log $E_{1\,cm.}^{1\%}$=2.45), 427 m$\mu$ log $E_{1\,cm.}^{1\%}$=2.00) and at 442 m$\mu$ (log $E_{1\,cm.}^{1\%}$=201)

and which shows the infra-red spectrum of FIG. 2, taken in potassium bromide, said antiobiotic actinomycin $Z_1$ having been produced by paper chromatographic separation of the actinomycin of claim 3.

10. The red crystalline antibiotic actinomycin $Z_5$, melting at 261–267° C., having the optical rotation $$[\alpha]_D^{22} = -284°$$

c.=0.244 in chloroform); giving in the elementary analysis the values: C=55.71%; H=6.44%; N=12.25%; whose ultraviolet spectrum exhibits bands at 428 m$\mu$ (log $E_{1\,cm.}^{1\%}$=2.21) and at 443 m$\mu$ (log $E_{1\,cm.}^{1\%}$=2.24)

and whose infra-red spectrum is shown in FIG. 3, said antibiotic actinomycin $Z_5$ having been produced by paper chromatographic separation of the actinomycin of claim 3.

References Cited by the Examiner

FOREIGN PATENTS 944,395   6/1956   Germany.

OTHER REFERENCES

Barnes: Analytical Chemistry, February 1948, pp. 96–98 (p. 97 is especially pertinent).

Pridham: Antibiotics Annual, 1956 to 1957, pp. 947–953.

Bossi et al.: Helv. Chem. Acta. 41; 1645–1652, 1958.

Roussos et al.: Chem. Soc. J. pt. 2, pp. 2469–2474.

JULIAN S. LEVITT, *Primary Examiner.*

WILLIAM B. KNIGHT, MORRIS O. WOLK, LEWIS GOTTS, *Examiners.*

D. LEVY, S. ROSEN, *Assistant Examiners.*